United States Patent

Harness et al.

[11] Patent Number: 6,086,831
[45] Date of Patent: Jul. 11, 2000

[54] MODULAR REACTION BLOCK ASSEMBLY WITH THERMOELECTRIC COOLING AND HEATING

[75] Inventors: James R. Harness, Lake Zurich; Larry W. Markus, Mundelein; Andrew J. Grzybowski, Spring Grove; Rudy H. Haidle, Evanston; Marek Turewicz, Lake Forest, all of Ill.

[73] Assignee: Mettler-Toledo Bohdan, Inc., Vernon Hills, Ill.

[21] Appl. No.: 09/090,021

[22] Filed: Jun. 10, 1998

[51] Int. Cl.[7] .............................. F25B 21/02; F25B 29/00
[52] U.S. Cl. ...................... 422/199; 422/196; 422/202; 422/131; 422/138; 165/263
[58] Field of Search .................... 422/131, 138, 422/109, 116, 199, 206, 196, 943, 202, 203; 165/65, 171, 264, 263, 64; 219/390, 521; 435/286.1, 289.1

[56] References Cited

U.S. PATENT DOCUMENTS

| | | | |
|---|---|---|---|
| 3,143,167 | 8/1964 | Vieth | 165/263 |
| 4,195,131 | 3/1980 | Papas | 435/286.1 |
| 4,517,338 | 5/1985 | Urdea et al. | 536/25.3 |
| 4,598,049 | 7/1986 | Zelinka et al. | 422/116 |
| 4,640,023 | 2/1987 | Mori et al. | 34/583 |
| 4,671,941 | 6/1987 | Niina et al. | 422/131 |
| 4,746,490 | 5/1988 | Saneii | 422/62 |
| 4,748,002 | 5/1988 | Neimark et al. | 422/116 |
| 4,865,986 | 9/1989 | Coy et al. | 435/290 |
| 5,061,630 | 10/1991 | Knopf et al. | 435/290 |
| 5,143,854 | 9/1992 | Pirrrung et al. | 436/518 |
| 5,252,296 | 10/1993 | Zuckermann et al. | 422/116 |
| 5,380,495 | 1/1995 | Chang et al. | 422/131 |
| 5,395,594 | 3/1995 | Nokihara et al. | 422/135 |
| 5,503,805 | 4/1996 | Sugarman et al. | 422/131 |
| 5,515,683 | 5/1996 | Kessler | 62/3.7 |
| 5,601,141 | 2/1997 | Gordon et al. | 165/263 |
| 5,716,584 | 2/1998 | Baker et al. | 422/131 |
| 5,789,258 | 8/1998 | Drinkwine et al. | 436/174 |
| 5,802,856 | 9/1998 | Schaper et al. | 62/3.7 |
| 5,819,842 | 10/1998 | Potter et al. | 165/206 |
| B1 5,324,483 | 3/1996 | Cody et al. | 422/131 |

Primary Examiner—Marian C. Knode
Assistant Examiner—Susan Ohorodnik
Attorney, Agent, or Firm—McEachran, Jambor, Keating, Bock & Kurtz

[57] ABSTRACT

An array of reaction assemblies for heating and cooling a plurality of reaction vessels. Each reaction vessel assembly including a heat conductive reaction block having an exterior wall and a reaction vessel receiving cavity formed in the block inwardly of the exterior wall. A thermoelectric module is mounted in heat transfer engagement with the exterior wall of the heat conductive reaction block. A fluid heat exchange element is mounted in heat transfer engagement with the thermoelectric module. The thermoelectric module has its junctions to selectively remove heat from the exterior wall of the reaction block or to supply heat to this exterior wall. Each thermoelectric module has thermoelectric junctions cascaded for increased heating and cooling range and a plurality of these junctions to increase capacity.

6 Claims, 6 Drawing Sheets

MODULAR REACTION BLOCK ASSEMBLY WITH THERMOELECTRIC COOLING AND HEATING

BACKGROUND AND SUMMARY OF THE INVENTION

A combinatorial chemistry technique called parallel synthesis is used to create libraries of structurally related chemical compounds which are then screened to identify the most desirable varieties of these structurally related compounds. The chemical compounds that pass the screening phase are then reacted and tested to determine which of them are most suitable for manufacturing. This later reaction and testing stage, usually referred to as process optimization, requires precise control of the heat input to the reaction process and the ability to quickly absorb any heat generated by exothermic reactions which, by necessity, must be individualized for each chemical compound being tested. To obtain efficiency of scale, a number of chemical compounds must be reacted and tested at one time creating difficulties in individually controlling the heat input to and absorbing the heat output of each chemical compound.

Additionally, since a relatively large quantity of each chemical compound is required for the process optimization testing, which quantity is considered large at least when compared with the quantities of each compound utilized during parallel synthesis, the reaction vessels are relatively large thereby limiting the size of the array of reaction vessels that can be readily accommodated in a laboratory. To avoid reducing even further the number of reaction vessels that can be handled in a conveniently sized array, the size of the temperature control elements for each reaction vessel must be limited. However, the ability to control exothermic reactions in such relatively large reaction vessels is critical and requires rapid cooling capacity. Further, precise control of the temperature-time slope of the heat input to each reaction vessel is necessary. This requires close control of the heat input and output for each reaction vessel. Accordingly, it is required that the temperature control elements, although compact in size, have high output and efficiency, both in their heating and in their cooling capacities.

Recent technological advancements in the area of new compound discovery are accelerating the rate that new compounds are discovered. The recently developed techniques of combinatorial chemistry and high throughput screening are the driving force behind this increased rate in the discovery of new compounds. The importance of these techniques is reflected by the fact that these techniques are already being applied to new compound discovery efforts in a variety of different industries, including the pharmaceutical, chemical, petrochemical, materials, food, biotechnology, and cosmetic industries. Additionally, few technologies have been accepted into the R&D laboratory as readily in such a short period of time as combinatorial chemistry and high throughput synthesis.

This increased rate of new compound discovery is beginning to create an increased demand on the activities of the process development laboratories of the respective industries. The process development activities of process screening, process optimizing and process characterizing must increase to meet the increased level of effort required. Increasing the rate of these activities in the process development laboratory will require the implementation of automation in these labs. Some automation currently exists for supporting the activities of process screening and process characterizing.

This invention is directed to an apparatus for general organic synthesis which is suitable for process optimization in order to bridge the gap between process screening and manufacturing and process characterization in the process development laboratory.

The apparatus of this invention permits a number of simultaneous chemical reactions with each chemical reaction having a sufficient volume to permit mimicking of the physical conditions found in the manufacturing environment.

A feature of this invention is an apparatus for process optimization synthesis which allows for individual controls of reaction times and temperatures of each of a number of reaction vessels arranged in an array.

Another feature of this invention is an apparatus for process optimization synthesis which provides for refluxing inert environments, magnetic mixing and removal of samples of the reacted chemicals for analysis in real time.

Another feature of this invention is a reaction block having a compact temperature control mechanism.

Another feature of this invention is a reaction block which can control exothermic reactions of chemical compounds through high capacity thermoelectric cooling.

Another feature of this invention is a reaction block which can control endothermic reactions of chemical compounds through high capacity thermoelectric heating.

Another feature of this invention is a reaction block having temperature control mechanisms which permit the precise control of the temperature-time slope of the reaction of a chemical compound in a reaction vessel.

Another feature of this invention is a reaction block having a thermoelectric heater and cooler in which the thermoelectric elements are cascaded for increased heating and cooling capabilities.

Another feature of this invention is a heating and cooling arrangement for a reaction vessel which provides higher capacity refluxing than can be obtained with fluid cooling.

Other objects and advantages of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENTS

Figure 1:
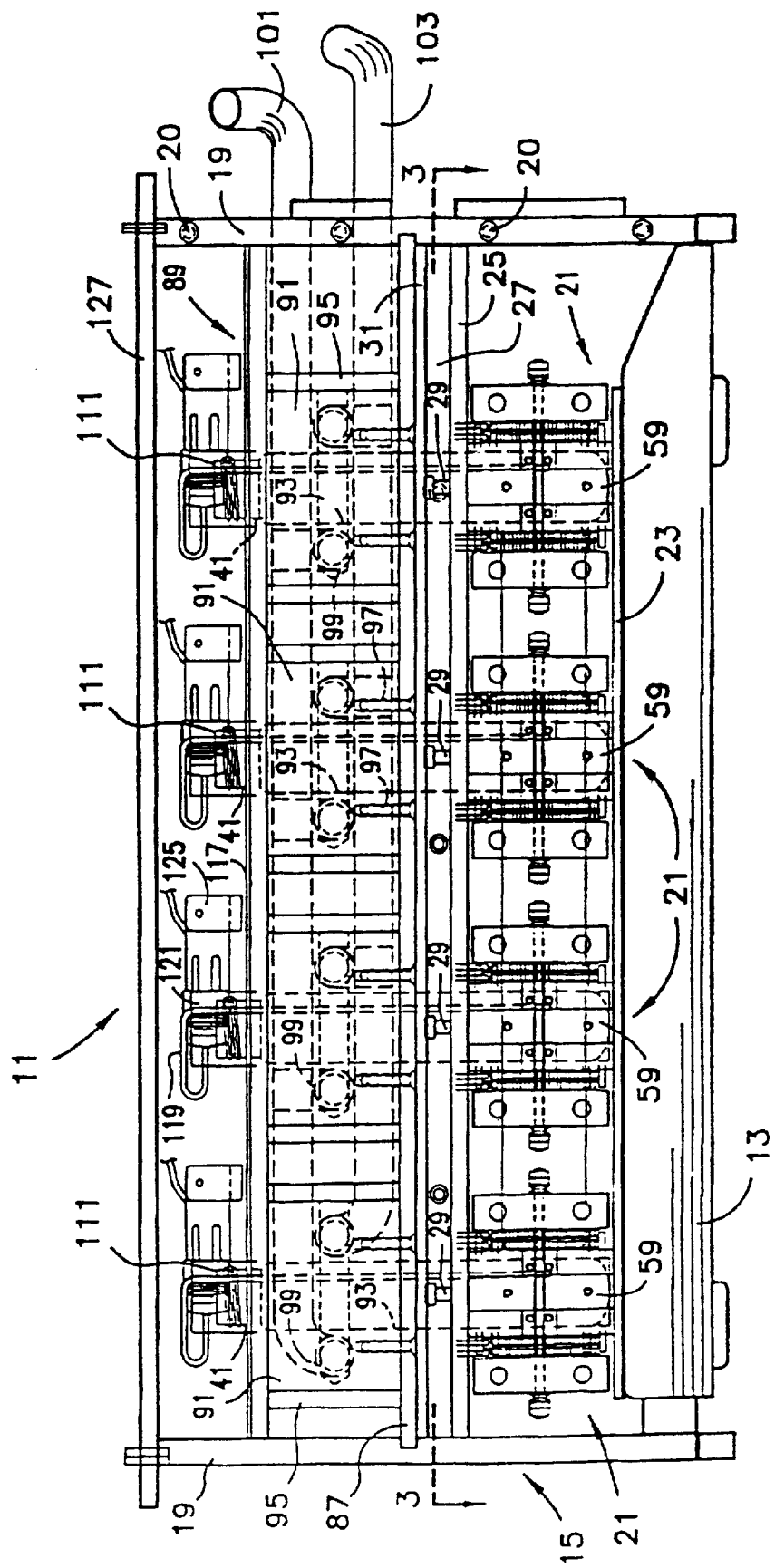
FIG. 1 is a front elevational view of one arrangement of an array of modular reaction block assemblies incorporating the novel aspects of this invention with the front wall of the housing and some other parts removed for clarity of illustration and some hidden parts shown in dashed lines.
Figure 2:
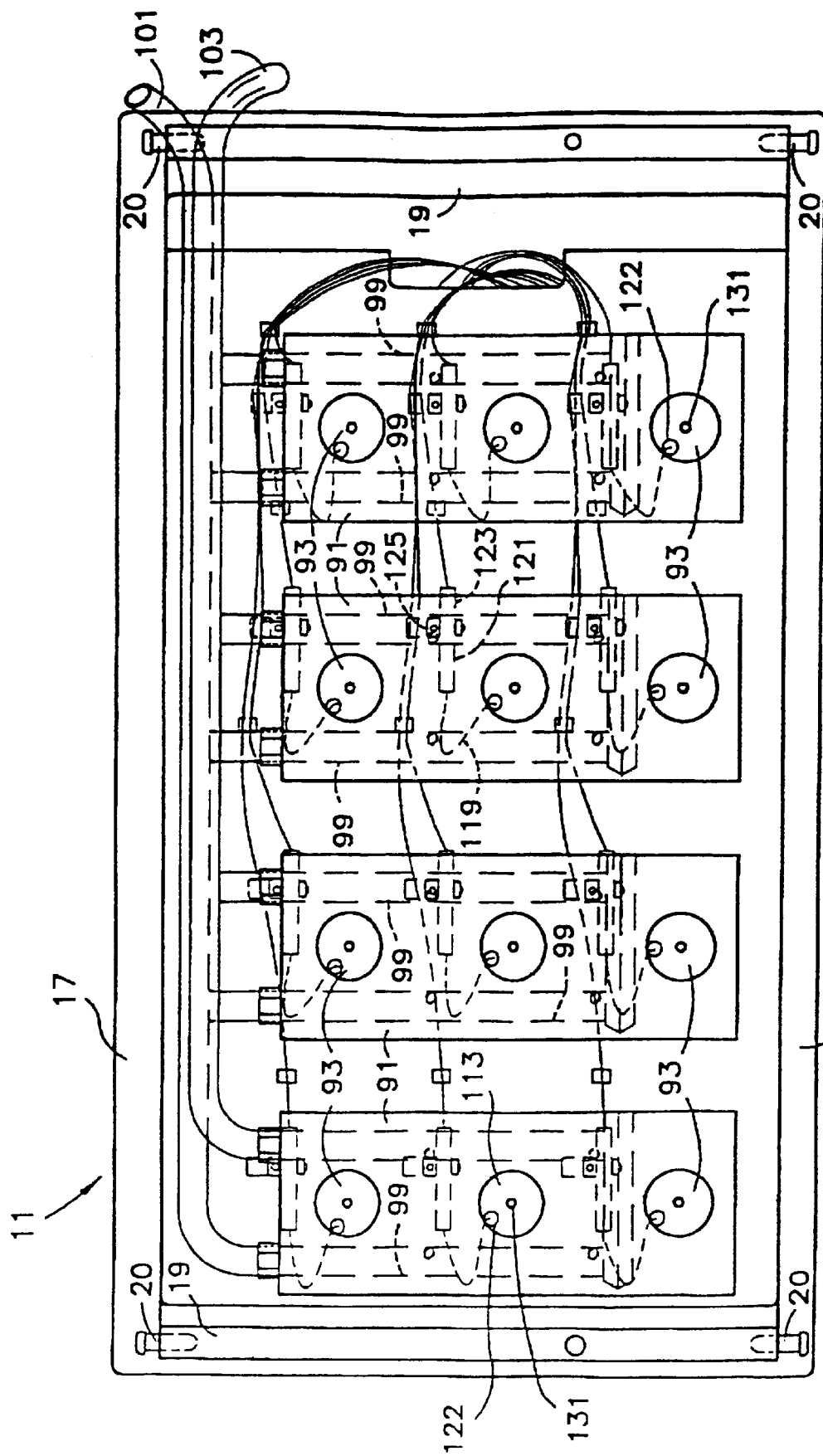
FIG. 2 is a top plan view of the array of FIG. 1 with the cover removed.

One arrangement of the apparatus of this invention, as shown in FIGS. 1, 2, 3 and 4 of the drawings, consists of an array 11 of modular reaction block assemblies. For sake of illustration and not by way of limitation, the accompanying drawings and specification describe an array containing 12 modular reaction block assemblies. However, it should be understood and appreciated that an array having a greater or lesser number of modular reaction block assemblies is entirely within the scope of the invention. Further, the array of reaction blocks of this invention is shown and described in the accompanying specification and drawings as having a horizontal cross section which is rectangular in shape. An array having a square, circular, hexagonal, octagonal or other horizontal cross section is also entirely within the scope of the present invention.

As shown in the drawings, the array 11 includes a magnetic stir plate 13 on which is supported a housing 15 having front and back walls 17 and end walls 19 fastened together by screws 20. A plurality, in this case 12, of modular reaction block assemblies 21, are supported on the magnetic stir plate 13 with a layer 23 of insulating material topped by a stainless steel sheet positioned between the stir plate and the reaction block assemblies. A layer 25 of insulating material is positioned on the top of the modular reaction block assemblies and an aluminum plate 27 is positioned on top of the insulation layer 25. Shoulder screws 29 are used to fasten the aluminum plate and the layer 25 of insulation to the reaction block assemblies 21 without crushing the layer 23. This arrangement provides an air gap 31 above the aluminum plate 27 which permits visual access to the interior of the array.

Figure 4:
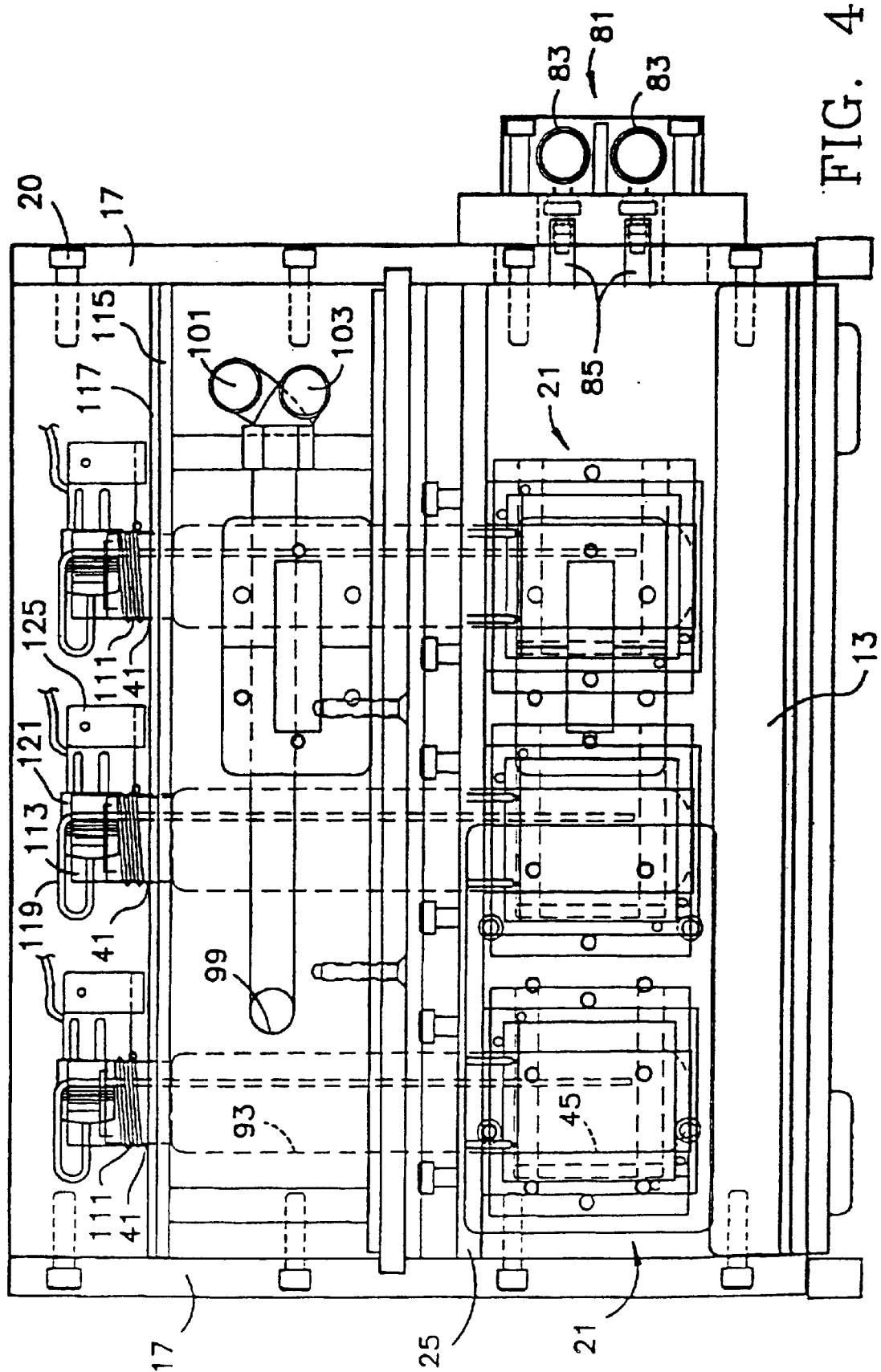
FIG. 4 is a side elevational view of the array of FIG. 1 with the side wall of the housing removed.
Figure 5:
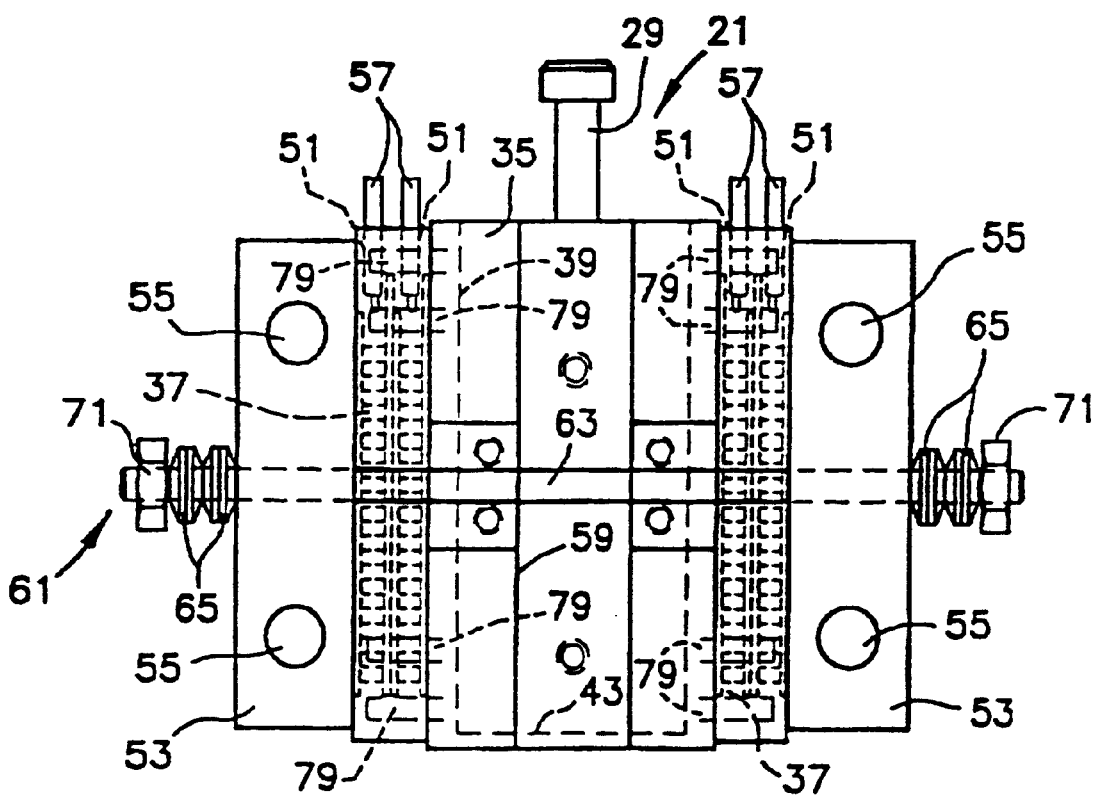
FIG. 5 is an enlarged front elevational view of a typical reaction block assembly of this invention with insulation and other parts omitted for clarity of illustration and some hidden parts shown in dashed lines.

Each of the modular reaction block assemblies 21, as shown in enlarged detail in FIG. 5 of the drawings, consists of an aluminum reaction block 35 of generally square horizontal cross section having exterior walls 37. Located inside the exterior walls, as shown in FIG. 4, is a vertically extending cavity 39 of circular horizontal cross section for receiving a reaction vessel 41 which is seated on a bottom 43 of the cavity. The reaction vessels 41 of this embodiment are made of conventional heat resistant glass although other conventional materials, such as PTFE, stainless steel, ceramics, etc., may be used.

Figure 3:
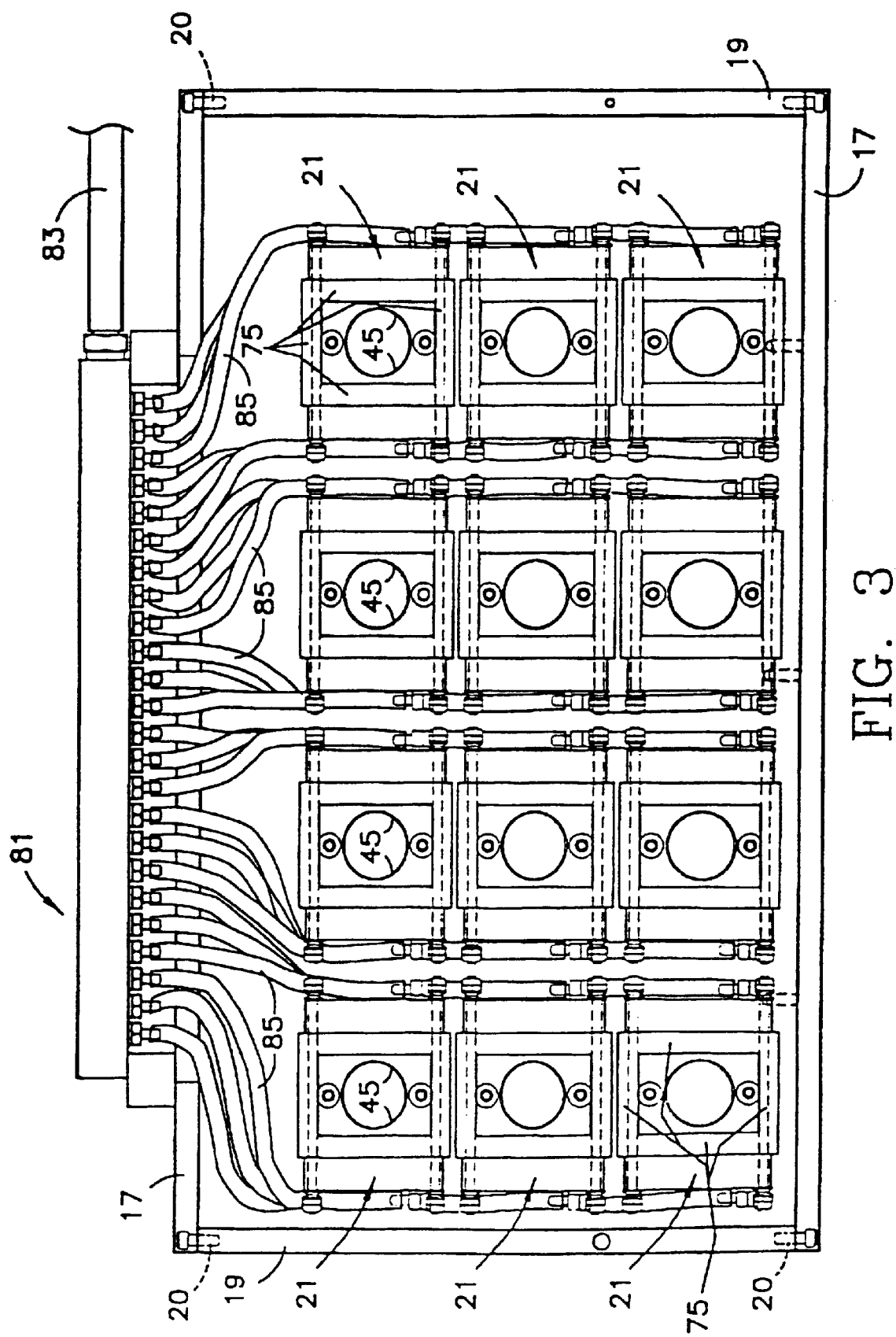
FIG. 3 is a sectional view taken along line 3—3 of FIG. 1.

As can best be seen in FIGS. 3, 4 and 5 of the drawings, multistage, modular thermoelectric heaters and coolers 51, usually referred to as modules or heat pumps, are positioned against oppositely located exterior walls 37 of each reaction block 35. The staging of individual modules to achieve a greater temperature differential is usually referred to as cascading with the assemblies called cascaded modules. The thermoelectric modules are of the type utilizing the Peltier effect created by direct electric current flowing therethrough. Suitable electronic solid state thermoelectric modules are sold under the trademark "MELCOR" by Materials Electronic Products Corporation of Trenton, N.J. Fluid heat exchange plates 53 are located on the outer surfaces of the cascaded pairs of thermoelectric modules 51. A pair of top and bottom parallel fluid passages 55 are formed in the plates 53 and wires 57 connect the thermoelectric modules 51 to a direct current power source which is not shown. Vertical grooves 59 are formed in the pair of oppositely located exterior walls 37 of the reaction block 35 which are not in contact with the modules 51.

Each reaction block assembly 21 is clamped together by fasteners 61 which extend through the heat exchange plates 53 and straddle the reaction block 35 as shown in FIGS. 3 and 5 of the drawings. Before each block assembly is clamped together, a thermal conductive sealant such as a silver filled, silicone based thermal grease is applied to the exterior surfaces of each of the thermoelectric modules 51 to improve heat transfer between the reaction blocks, the modules and the fluid heat exchange plates. Each clamping fastener 61 includes a threaded rod 63 with two pairs of Belleville spring washers 65 located on the threaded rod near an end thereof and engaging the outer walls of the fluid heat exchange plates 53. A pair of flat washers (not shown) are located on opposite sides of the Belleville washers 65 and a lock washer (also not shown) is located outwardly of the flat washers and inwardly of nuts 71 threaded onto the opposite ends of the threaded rod 63. A clamping arrangement of this type is provided because of the extreme expansion and contraction of each of the modular reaction block assemblies 21 due to the variances in temperature experienced during heating and cooling of the reaction vessels 41 which range from −20 degrees C. to +140 degrees C. Foam insulation 75 is applied to the bottom and outer walls of the aluminum reaction block 35, i.e., the portions thereof, against which thermoelectric modules 51 are not in contact. It is not applied to the top wall of the reaction block. This insulation 75 is shown in FIG. 3 but omitted from FIGS. 1 and 5 of the drawings for clarity of illustration. Various foam insulations may be used but micro glass ball foam is preferred. The thermoelectric modules 51 are mounted on the reaction blocks 35 in a manner which allows the modules to "float" to accommodate their expansion and contraction caused by the wide temperature variance of their operating parameters. The mounting is accomplished by pairs of posts 79 extending outwardly of the reaction block, as shown in FIG. 5, and located at diagonally opposite corners of the modules 51 to engage the edges of the modules inwardly of each corner. The posts 79 extend outwardly of the reaction block to about the middle of the outer module.

A manifold 81 shown in FIGS. 3 and 4 is connected by hoses 83 to a chiller (not shown) and to the passages 55 in the fluid heat exchange plates 53 by hoses 85.

A platform 87 of glass epoxy is supported on the walls 17 and 19 of the housing 15 as is most clearly shown in FIGS. 1 and 4 of the drawings. The platform supports an array 89 of auxiliary fluid heat exchange blocks 91. A passage 93 for each reaction vessel 41 is formed in each auxiliary fluid heat exchange block 91. The auxiliary fluid heat exchange blocks are located above the reaction block assemblies 21 and are formed with passages 93 which are aligned with the cavities 45 of the reaction block assemblies. Insulation 95 is provided on the outer walls of the auxiliary fluid heat exchange blocks 91. Screws 97 attach the platform 87 to the auxiliary fluid heat exchange blocks 91. Passages 99 for the heat exchange fluid are formed in the blocks. A manifold hose 101 provides chilled water to the passages 99 and a return manifold hose 103 returns the water to a chiller (not shown).

One reaction vessel 41 is provided for each cavity 45 of each reaction block 35 and its aligned passage 93 in each auxiliary fluid heat exchange block 91. Each reaction vessel has a threaded top opening 111 which receives a reaction vessel cap 113 with the threaded top openings and reaction vessel caps 113 of the reaction vessels extending above a layer 115 of insulation which is covered by a stainless steel sheet 117. A thermocouple probe 119 with a plug 121 is provided for each reaction vessel. The probe 119 has a leg that extends through a notch 122 in the periphery of reaction vessel cap 113. Each plug 121 connects to a socket 123 which is mounted on a thermocouple bracket 125 attached to the upper surface of the insulation covering sheet 117. An insulated cover 127 is provided for the housing 15 and rests on the top edges of the housing walls 17 and 19. The cover 127 has passages 129 formed in alignment with passages 131 in each cap 113 to permit real time sampling of the contents of the reaction vessels 41.

Figure 6:
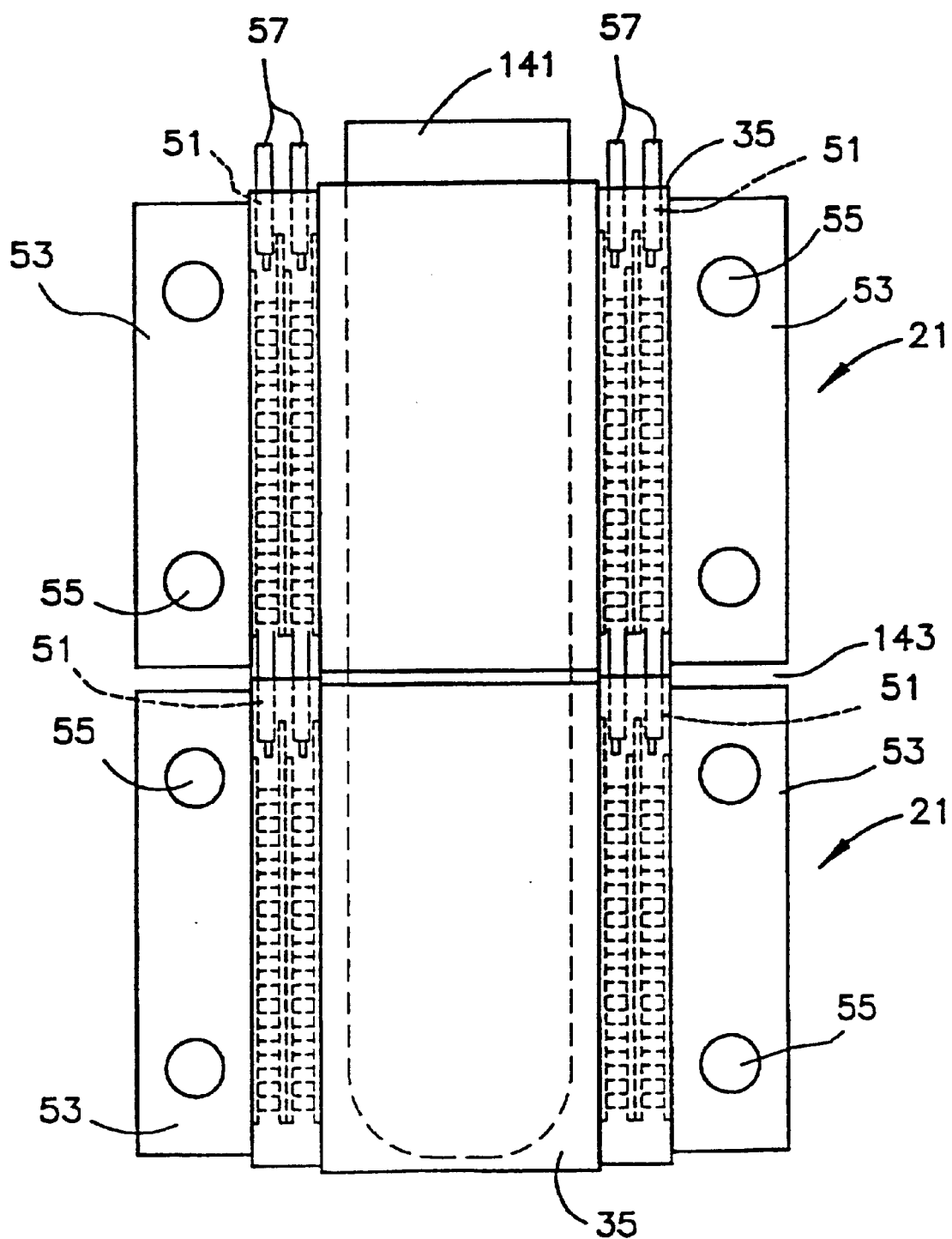
FIG. 6 is a somewhat schematic vertical cross-sectional view of a pair of reaction block assemblies stacked one on the other to provide a high capacity refluxing for a reaction vessel with the insulation and other parts omitted for clarity of illustration and some hidden parts shown in dashed lines.

FIG. 6 of the drawings shows a pair of modular reaction block assemblies 21 stacked one on the other to provide two separately controllable temperature zones for a reaction vessel 141. The reaction block assemblies are identical to those previously disclosed and may be used in a stacked pair as shown in the drawings. Stacked pairs of reaction block assemblies may be connected in an array such as the array 11 shown in FIGS. 1 to 5 of the drawings or any of the alternate arrays previously discussed. An air gap 143 may be provided between the upper and lower reaction block assemblies 21 to provide visual access to the reaction vessel 141. The pair of modular reaction block assemblies of this embodiment permits one zone of cooling in a lower portion of the reaction vessel 141 and a second zone of cooling in an upper portion of the reaction vessel which is of greater capacity due to the cascaded thermoelectric modules than the cooling capacity which can be obtained by a fluid cooled heat exchange block such as those described in connection with the embodiment of the invention shown in FIGS. 1 through 5 of the drawings.

The modular reaction block assemblies of this invention can be incorporated into a process optimization work station. The temperatures of the chemical compounds in each reaction vessel 41 are detected by the probes 119. The temperatures of the reaction blocks are determined by thermocouples (not shown) which are located in the grooves 59 formed in the exterior walls of the reaction blocks 35. Samples of the chemical compounds in the reaction vessels 41 can be removed for real time analysis of the reactions by automated syringe samplers through the passages 131 in the covers 127 and the passages 131 in the caps 113. Mixing of the chemical solutions in the reaction vessels is accomplished by the introduction of a magnetic stirring bar into each reaction vessel and the actuation of the magnetic stir plate 13. The operation of the thermoelectric modules 51 is controlled by Windows-based software using a personal computer.

What is claimed is:

1. A reaction assembly for selectively heating or cooling a reaction vessel, said reaction assembly including:
   a heat conductive reaction block having at least one exterior wall and a reaction vessel receiving cavity formed in said block inwardly of said exterior wall,
   a thermoelectric module mounted in heat transfer engagement with said exterior wall of said heat conductive reaction block,
   a fluid heat exchange element mounted in heat transfer engagement with said thermoelectric module,
   said thermoelectric module being alternately energizable to selectively remove heat from said exterior wall of said heat conductive reaction block and transfer said heat to said fluid exchange element or to supply heat to said exterior wall of said heat conductive block,
   said reaction vessel shaped to be received in said reaction vessel receiving cavity and being elongated with upper and lower portions,
   said reaction vessel receiving cavity being sized to receive only said lower portion of said reaction vessel with said upper portion of said reaction vessel extending above said reaction block,
   an auxiliary fluid heat exchange element having a reaction vessel receiving passage extending therethrough in alignment with said reaction vessel receiving cavity and positioned to receive an upper portion of said reaction vessel, and
   said auxiliary fluid heat exchange element having fluid passages formed therein for attachment to a fluid supply.

2. The reaction assembly of claim 1 in which said heat conductive reaction block is formed with a pair of oppositely facing exterior walls, said thermoelectric module is mounted in heat transfer engagement with each of said oppositely facing exterior walls, and said fluid heat exchange element is mounted in heat transfer engagement with each of said thermoelectric modules.

3. The reaction assembly of claim 1 in which said thermoelectric module is formed of thermoelectric junctions cascaded for increased heating and cooling range and capacity.

4. An array of reaction assemblies for selectively heating and cooling a plurality of reaction vessels, said array including:
   a plurality of heat conductive reaction blocks, each reaction block having at least one exterior wall and a reaction vessel receiving cavity formed in each said block inwardly of each of said exterior walls,
   a thermoelectric module mounted in heat transfer engagement with each of said exterior walls of said heat reaction block,
   a fluid exchange element mounted in heat transfer engagement with each of said thermoelectric modules,
   each of said thermoelectric modules being alternately energizable to selectively remove heat from one of said exterior walls of one of said reaction blocks and transfer said heat to one of said fluid heat exchange elements or to supply heat to one of said exterior walls of said conductive block,
   each reaction vessel shaped to be received in one of said reaction vessel receiving cavities and being elongated having upper and lower portions,
   each of said reaction vessel receiving cavities sized to receive only said lower portion of one of said reaction vessels with said upper portion of each of said reaction vessels extending above its reaction block,
   an array of auxiliary fluid heat exchange elements, one for each of said reaction assemblies in said array, each auxiliary element having a reaction vessel receiving passage extending therethrough in alignment with one of said reaction vessel receiving cavities and positioned to receive an upper portion of one of said reaction vessels, and
   each of said auxiliary fluid exchange elements having fluid passages formed therein for attachment to a fluid supply.

5. The array of reaction assemblies of claim 4 in which each reaction block is formed with a pair of oppositely facing exterior walls, said thermoelectric module is mounted in heat transfer engagement with each of said exterior walls, and said fluid heat exchange element is mounted in heat transfer engagement with each of said thermoelectric modules.

6. The array of reaction assemblies of claim 4 in which each of said thermoelectric modules is formed of thermoelectric junctions cascaded for increased heating and cooling range and a plurality of said junctions to increase capacity.

* * * * *